United States Patent
Harris, Sr.

(10) Patent No.: US 11,122,750 B1
(45) Date of Patent: Sep. 21, 2021

(54) BOTTOMLESS IN-GROUND WATER CONSERVATION AND CONTAMINATION PREVENTION GARDEN PLANT WATERING WELL WITH EXTERNAL HELICAL THREADS

(71) Applicant: Donald Eugene Harris, Sr., Cedar Park, TX (US)

(72) Inventor: Donald Eugene Harris, Sr., Cedar Park, TX (US)

(*) Notice: Subject to any disclaimer, the term of this patent is extended or adjusted under 35 U.S.C. 154(b) by 0 days.

(21) Appl. No.: 16/953,956

(22) Filed: Nov. 20, 2020

(51) Int. Cl.
*A01G 9/02* (2018.01)
*A01G 9/28* (2018.01)
*A01G 25/06* (2006.01)

(52) U.S. Cl.
CPC .............. *A01G 9/28* (2018.02); *A01G 25/06* (2013.01)

(58) Field of Classification Search
CPC .... A01G 13/04; A01G 13/0237; A01G 13/02; A01G 9/02; A01G 9/021; A01G 13/10; A01G 13/105; A01G 23/043; A01G 9/16; A01G 13/0243; A01G 13/0281
See application file for complete search history.

(56) References Cited

U.S. PATENT DOCUMENTS

| | | | | |
|---|---|---|---|---|
| 3,369,321 | A * | 2/1968 | Blackistone, Jr. | A47G 7/06 47/41.1 |
| 4,939,865 | A * | 7/1990 | Whitcomb | A01G 9/02 47/77 |
| 5,359,809 | A * | 11/1994 | Johnson | A01G 23/04 220/4.24 |
| 8,826,588 | B1 * | 9/2014 | MacKichan | A01G 9/124 47/30 |
| 9,456,560 | B1 * | 10/2016 | MacKichan | A01G 25/00 |
| 10,123,490 | B2 * | 11/2018 | Harris, Sr. | A01G 13/0237 |
| 10,314,247 | B2 * | 6/2019 | Harris, Sr. | A01G 9/0291 |
| 2002/0005011 | A1 * | 1/2002 | Goldberg | A01G 9/028 47/65.5 |

* cited by examiner

*Primary Examiner* — Trinh T Nguyen

(57) ABSTRACT

An in-ground plant container with a watering-well that is open at both ends and is functional and decorative. The above-ground portion in this present embodiment has a round bowl-shaped water well and broadly rounded lip for ease of gripping and placing in an appropriately sized hole. The bowl of the watering-well keeps the plant container above ground. The bottom, below ground portion, has vertical fins for lateral stability in the soil. This embodiment also has external helical threads at its base for ease of placement in loosened soil. The above ground portion of the plant container watering-well can be wider than the base and replaces the organic soil watering-well. This in-ground plant container with watering-well is for conserving water, and the containment of localized water contaminated by pesticides, herbicides, and fertilizers.

1 Claim, 4 Drawing Sheets

BOTTOMLESS IN-GROUND WATER CONSERVATION AND CONTAMINATION PREVENTION GARDEN PLANT WATERING WELL WITH EXTERNAL HELICAL THREADS

FIELD OF THE INVENTION

This present embodiment relates to bottomless garden plant containers and, more particularly, to a bottomless garden plant container that conserves water and prevents unwanted water waste, including the prevention of pesticide, herbicide, and fertilizer contamination due to uncontrolled water runoff; and is closely related to issued U.S. Pat. No. 10,123,490 B2 Nov. 13, 2018 BOTTOMLESS IN-GROUND WATER CONSERVATION AND CONTAMINATION PREVENTION GARDEN-PLANT WATERING-WELL. Inventor: DONALD EUGENE HARRIS, SR.

BACKGROUND

Plant and flower gardening have been around since the beginning of civilization and with it comes the continuous need for fertilizer, weed and pest prevention, and water-lots and lots of water. Water has always been a precious, and, an invaluable resource, and in today's world, it is even more so, and the need for conserving it is at an all-time high.

Nearly every home in nearly every place-has an area where they will tend to have plants and flowers growing, or someone is attempting to do so. According to the article, 'Blades of glory: America's love affair with lawns,' in the Jun. 24, 2011 edition of the magazine, The Week, about 80 percent of American homes have yards—and based on the 2011 American Housing Survey of the United States, there are approximately 100 million houses in America. This means there are approximately 80 million American yards, or variants of yards, that can be landscaped—and landscapes need watering.

The scope of this embodiment does not deal with watering lawns-its focus is primarily with the many flowering annuals, perennials, bulbs, small to larger shrubs, and all the varying things gardeners like to plant in the soil of all these yards aside from lawn. This equates to lots of watering, fertilizing, herbicides, and the applying of pesticides; and herein lies the problem: lots of water, contaminated with fertilizers, herbicides, and pesticides can end up flowing away from the target plant and/or flowers towards areas for which they were intended.

Every day there is someone, somewhere, watering a plant in their garden; and along with them are the gardening enthusiasts, who out of love for their little botanical friends, are diligently applying fertilizers, pesticides, and herbicides. One outcome that these well-meaning groups can have in common is this: more-often-than-not they watch helplessly as much of the needed water, and gardening additives, flow to surrounding areas and away from the plant for which they were intended; and in today's world water has become a commodity, and its conservation is a responsibility in which each person should participate. There have been attempts at correcting this seemingly universal problem for gardeners for many years and the most common solution was to build up a bowl-shaped mound of soil around the base of the plant (commonly referred to as a soil watering-well) to contain the water long enough for it to percolate down to the plant's roots. A few of the other solutions are the use of mulches piled around the plant in the hopes of retaining moisture, or stones sunk into the soil around the plant as a border, or to simply place the plant several inches below ground level.

Unfortunately, the aforementioned so-called solutions, along with many others, generally fail soon after their implementation. The soil watering-wells tend to absorb water laterally as well as gravitationally and by the very act of watering are eroded away. And as the soil surface gets drier water has less time to saturate into the ground before it becomes wasteful runoff and often, taking with it, gardening chemicals such as fertilizers, pesticides, and herbicides. Mulch mounds are not much better at solving the issue-in fact they can exacerbate the problem of garden chemical products like pesticides and herbicide runoff. Mulches are breeding grounds for pests like earwigs and pill-bugs to name a few, which encourages greater use of pesticides which then accumulates in the mulches; and mulches tend to float and flow with water runoff from overwatering and large downpours of rain. These so-called solution failures are typical of the other solutions as well as those not mentioned. The worst consequence of these runoffs are the gardening chemicals used to help grow and protect our garden plants, often end up flowing into street gutters, streams, ponds, and other environmentally sensitive areas. Although there are various methods of trying to prevent water and chemical runoff, all, or almost all suffer from one, or more than one disadvantage.

Therefore, there is a need to provide methods and apparatus for improved, and more secure methods, for the prevention of wasteful water runoff and the containment of useful gardening products to prevent them from becoming a detriment, and danger, to their surrounding environments.

As long as there are plants and water, there will be gardening and gardening is here stay and it can be done more effectively and environmentally friendly.

PRIOR ART

I am aware of U.S. Pat. No. US 2009/0025290 A1, Jan. 29, 2009, Bottomless Plant Container which was issued to Ball Horticultural Company for growing plants in an open-bottom plant container.

I am, also aware of prior art U.S. Pat. No.: US 2002/0005011 A1 issued to Lauri and David Goldberg Jan. 17, 2002 Bottomless Compartmentalized In-Ground Garden Container.

Shortcomings of Other Solutions

U.S. Pat. No. U.S. 2009/0025290 A1 Open-bottom plant container is a temporary biodegradable container for transporting rooted plants for placing in their final growing site. These products are designed as only temporary containers; whereas this present embodiment of the Bottomless In-Ground Water Conservation and Contamination Prevention Garden-Plant Watering-Well is for permanent use.

Also, it is neither taught nor suggested that U.S. Pat. No. US 2009/0025290 A1 Bottomless Plant Container is so designed as to conserve water and/or prevent the runoff of gardening chemicals or products.

U.S. Pat. No.: US 2002/0005011 A1: What is disclosed is a garden container that includes a rigid outer wall defining a perimeter and having opposite upper and lower edges around the perimeter. Its outer and inner circular walls and intersecting walls are so designed to slice into the soil. It is neither taught nor suggested that this bottomless container is so designed as to conserve water and/or prevent the runoff of gardening chemicals or products. It is also stated that the ... container may be manually placed or depressed into the soil until the rim of the container is generally flush with the soil surface," (excerpt from Summary of the Invention).

Unfortunately, being flush with the soil allows for wasteful water runoff, chemical contamination of surrounding areas, and the dispersion of other gardening products. This prior art bottomless garden container is subject to vertical movement, both upwards and downwards, which could result in all or portions of the container sinking below ground level and it is neither taught nor suggested that this device was designed to prevent that from happening.

Advantages of Present Embodiment

Thus, several advantages of one or more aspects would be to provide a bottomless in-ground plant container that conserves water via the use of a non-eroding watering-well.

Other advantages of one or more aspects are to provide a bottomless in-ground plant container watering-well that can be both decorative and functional.

It would further be advantageous to provide a bottomless in-ground plant container watering-well that helps protects its surrounding environments from harmful herbicides, pesticides, and fertilizer runoff.

It would also be advantageous to have a bottomless in-ground plant container watering-well that protects plants and flowers from grass trimmers above ground and help prevent unwanted weeds and grass rhizomes below ground.

It would further be advantages to have a bottomless in-ground plant container watering-well that encourages earthworm growth and population for plant and soil health.

It would also be advantages to have a bottomless in-ground plant container watering-well that directs water to flow down to the plant's roots instead of flowing away from the roots and across the soil's surface.

These and other advantages of one or more aspects will become apparent from a consideration of the ensuing description and accompanying drawings.

SUMMARY OF THE INVENTION

The present embodiment of the Bottomless In-Ground Water Conservation and Contamination Prevention Garden Plant Watering-Well with External Helical Threads, there is provided an in-ground plant container that is open at both ends and is functional and decorative. The above-ground portion has a round bowl-shaped watering-well and rounded rim for ease of gripping and placing in an appropriately sized hole. The rounded rim also offers support for plant stalks. The below-ground portion (barrel) has external helical threads for twisting watering-well into the soil, and the external helical threads also help in prevention against vertical lifting due to soil movement. The portion of the plant container watering-well's bowl in this embodiment is wider than the below-ground portion (barrel) and replaces a soil watering-well and keeps watering-well safely above ground level. In another aspect of the embodiment, an optional clear convex lid snaps on over a bottomless in-ground plant container watering-well with external helical threads to create a mini-greenhouse for things such as early starting of seedlings; or preservation of bulbs.

BRIEF DESCRIPTION OF THE DRAWINGS

A complete understanding of the present embodiment may be obtained by reference to the accompanying drawings, when considered in conjunction with the subsequent, detailed description, in which.

For purposes of clarity and brevity, like elements and components, will bear the same designations and numbering throughout the Figures.

DESCRIPTION OF THE PRESENT EMBODIMENT

Before this first embodiment of a Bottomless In-Ground Water Conservation and Contamination Prevention Garden-Plant Watering-Well, along with its methods are disclosed and described, it is to be understood that this first embodiment is not limited to the particular configurations, sizes, and materials disclosed herein as such configurations, sizes, and materials may vary somewhat. It is also to be understood that the terminology employed is used for the purpose of describing this particular embodiment and is not intended to be limiting; however, for brevity's sake throughout the description, Bottomless In-Ground Water Conservation, and Contamination Prevention Garden-Plant Watering-Well with External Helical Threads will be referenced simply as watering-well.

Figure 1A:
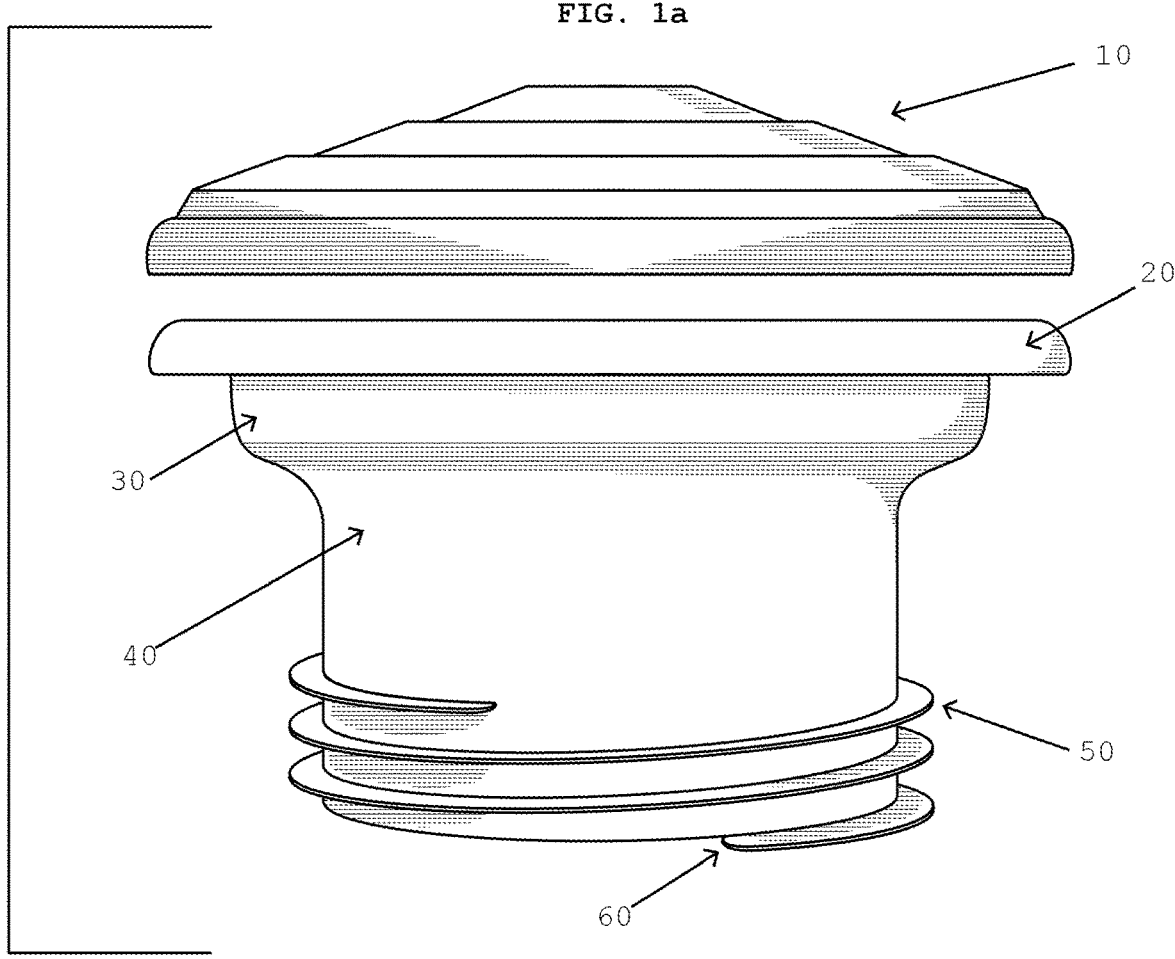
FIG. 1a-1b are front perspective views of a plant container watering-well embodiment with external helical threads showing the use of a clear plastic cover and one aspect shows a clear plastic cover attached to said plant container watering-well.
Figure 1B:
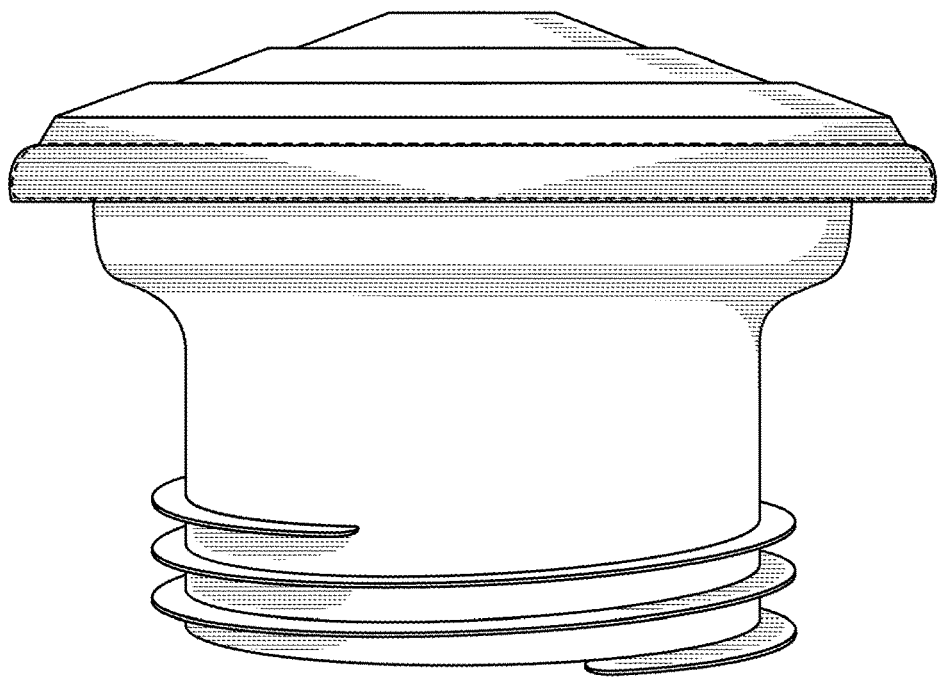

FIGS. 1a-1b is front perspective views of a watering-well in accordance with the present embodiment. Watering-wells may circumference of plastics, metals or any other suitable materials. Moreover, the watering-well bowl 30 in this embodiment is circular, but in alternate embodiments, it can be shaped as a rectangle, square or any other geometrical shape or any organic shape or configuration deemed to be aesthetically pleasing or advantageous. This particular embodiment, save for the optional clear plastic cover 10 is of a single unified construction which will be apparent to those skilled in the art of plastic fabrication. Watering-wells can have their above-ground bowls 30 and rim 20 outer circumferences greater than a below-ground barrel's 40 circumference as in the case of this present embodiment. The width and height of the bowl 30 have a dual purpose, 1) for temporarily holding an appropriate volume of water for plants, 2) shield plants from grass trimmers and mowers during routine lawn maintenance.

An optional durable flexible clear plastic cover 10 can be snapped on, and popped off the rim 20, to allow a person to start seeds, or place seedlings in a protected environment. The rim 20 is seamlessly attached to the top of the bowl 30 extends up and out over the bowl 30 for ease of handling as well as additional strength for twisting a barrel 40 with external helical threads 50 seamlessly attached to its outer wall in this embodiment into an appropriately sized hole. The rim 20 also works as an additional defense along with the bowl 30, to prevent the watering-well from sinking too, or below, the ground-level should an embodiment not incorporate external helical threads 50 with spurs 60 on the barrel's 40 outer walls. The bowl 30 is the actual replacement for its organic counterpart the soil watering-well.

Figure 2:
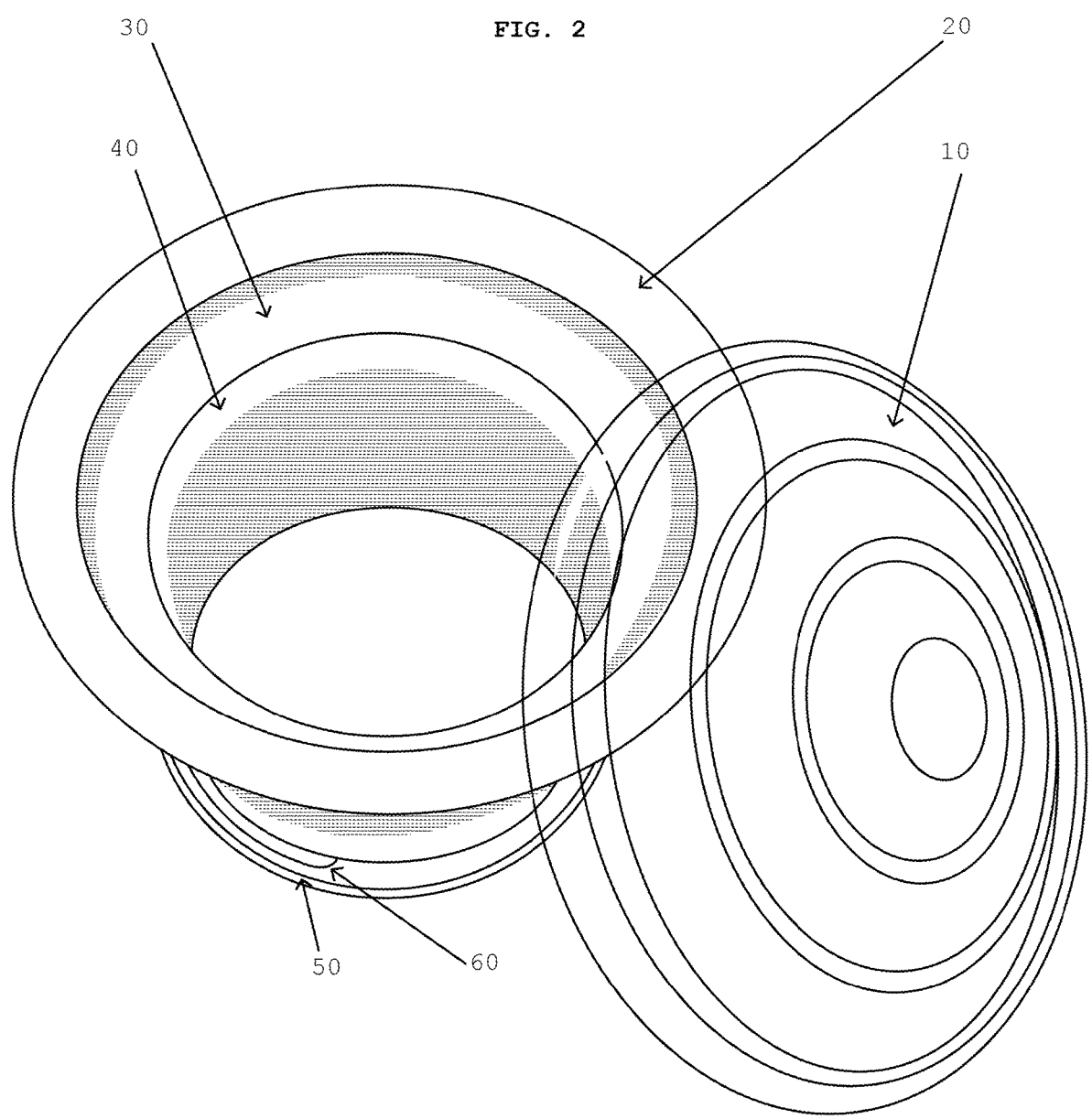
FIG. 2 is a top perspective view of an embodiment of the plant container watering-well with external helical threads and spurs and said clear plastic cover leaning on said plant container watering-well.

FIG. 2 is a top perspective view of a figure and shows the present embodiment with external helical threads 50 and spurs 60. The external helical threads 50 and spurs 60 work to help in ease of installation into an appropriately sized hole and in the prevention of the watering-well from rising and sinking and for ease of removal.

Figure 3:
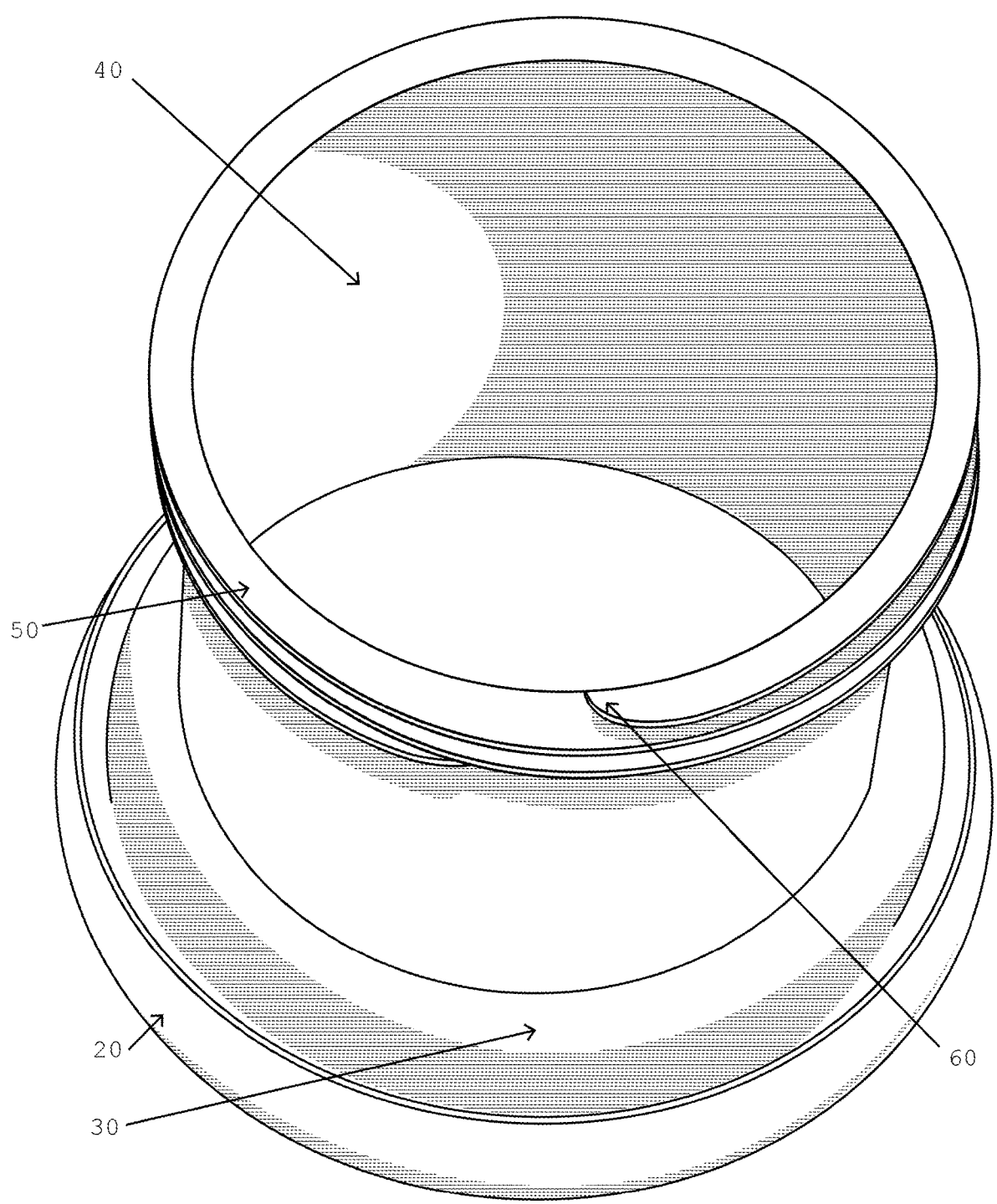
FIG. 3 is a bottom perspective view of a plant container watering-well with external helical threads and spurs.

FIG. 3 is a bottom perspective view of a figure and shows external helical threads 50 and spurs 60 dual-purpose, 1) for ease of installation, 2) prevention of the watering-well from rising and sinking and for ease of removal.

Figure 4:
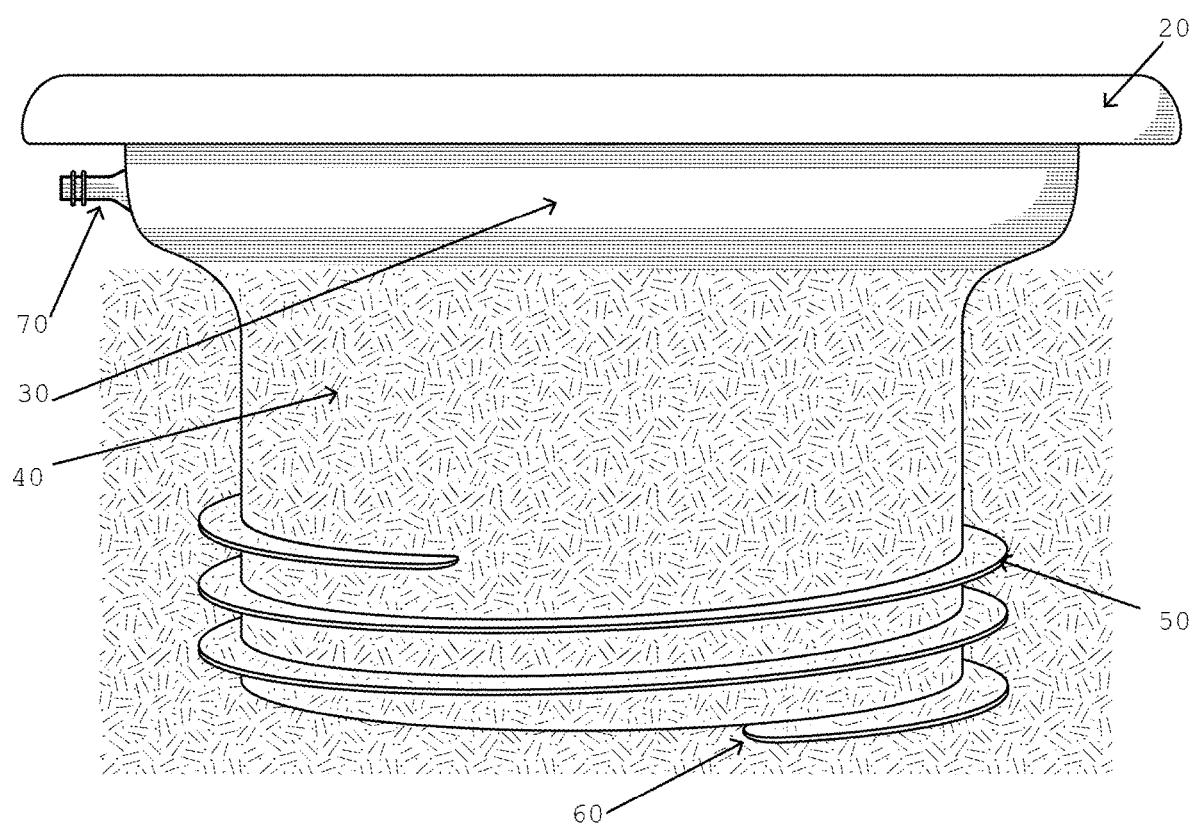
FIG. 4 is a side view of a plant container watering-well with external helical threads and spurs placed in soil, and this aspect has an optional quick-connect valve for drip irrigation capable watering-wells.

FIG. 4 is a side view of a plant container watering-well with external helical threads 50 and spurs 60 placed in soil, and this aspect has an optional quick-connect valve 70 for drip irrigation capable watering-wells.

Since other modifications and changes varied to fit particular operating requirements and environments will be apparent to those skilled in the art, the invention is not considered limited to the examples chosen for purposes of disclosure and covers all changes and modifications which do not constitute departures from the true spirit and scope of this invention. Having thus described the invention, what is desired to be protected by Letters Patent is presented in the subsequently appended claims.

What is claimed is:

1. A bottomless in-ground watering-well comprising: a bowl having a bottom with an aperture extending therethrough defined by a perimeter, a curved-rim circumferentially connected to a top edge of said bowl and configured to maintain said top edge above ground-level when said watering-well is in an installed position; said bowl functioning as a temporary well for water and liquids received in said bowl; a barrel circumferentially connected to said perimeter of said bowl; said barrel configured to permit downward flow of water and liquids when said watering-well is in an installed position, a single contiguous external helical thread connected circumferentially to an exterior wall of said barrel and extending substantially perpendicularly from said exterior wall of said barrel, wherein said single contiguous external helical thread having two spurs, a first spur is at said contiguous external helical thread's anterior which located approximately near the bottom edge of the barrel and a second spur is at said contiguous external helical thread's posterior which located on the bottom edge of the barrel; and said single contiguous external helical thread in conjunction with said two spurs are configured to ease rotation of said watering-well during installation and to minimize movement in a direction of a longitudinal axis of said watering-well when said watering-well is in an installed position.

* * * * *